(12) United States Patent
Kelly et al.

(10) Patent No.: US 8,942,539 B2
(45) Date of Patent: *Jan. 27, 2015

(54) METHOD OF SETTING A SYSTEM TIME CLOCK AT THE START OF AN MPEG SEQUENCE

(75) Inventors: Declan Patrick Kelly, Eindhoven (NL); Wilhelmus Jacobus Van Gestel, Eindhoven (NL); Pieter Bas Ijdens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 99 days.

This patent is subject to a terminal disclaimer.

(21) Appl. No.: 13/326,661

(22) Filed: Dec. 15, 2011

(65) Prior Publication Data
US 2012/0082433 A1 Apr. 5, 2012

Related U.S. Application Data

(63) Continuation of application No. 09/936,185, filed as application No. PCT/EP01/00110 on Jan. 5, 2001, now Pat. No. 8,098,973.

(30) Foreign Application Priority Data

Jan. 10, 2000 (EP) .................................... 00200038

(51) Int. Cl.
*H04N 9/80* (2006.01)
*G11B 27/00* (2006.01)
(Continued)

(52) U.S. Cl.
CPC ............ *G11B 27/005* (2013.01); *G11B 27/034* (2013.01); *G11B 27/105* (2013.01); *G11B 27/28* (2013.01); *G11B 27/3027* (2013.01); *H04N 9/8042* (2013.01); *H04N 21/242* (2013.01); *H04N 21/4147* (2013.01);
(Continued)

(58) Field of Classification Search
USPC .......................................... 386/241, 326, 334
See application file for complete search history.

(56) References Cited

U.S. PATENT DOCUMENTS 5,420,866 A * 5/1995 Wasilewski .................... 370/426
5,703,877 A * 12/1997 Nuber et al. ............. 370/395.64
(Continued)

FOREIGN PATENT DOCUMENTS

EP  0794667 A2  9/1997
EP  0942603 A2  9/1999
(Continued)

OTHER PUBLICATIONS

Information Technology—Generic Coding of Moving Pictures and Associated Audio Information Systems: International Standard, Reference No. ISO/IEC 13818-1:1996(e), XP000667435.

*Primary Examiner* — Thai Tran
*Assistant Examiner* — Stephen Smith

(57) ABSTRACT

Method to enable a local system time clock counter (STC) of a receiving recording device to lock to program clock reference (PCR) information comprised in a received real time sequence of information signal packets, such as MPEG2 Transport Stream packets. The method comprising determining the number of cycles between arrival of the first information signal packet and the arrival of the information signal packet comprising the first Program Clock Reference (PCR) information. This information is stored as an attribute of the stored sequence.

18 Claims, 5 Drawing Sheets

Figure 1:
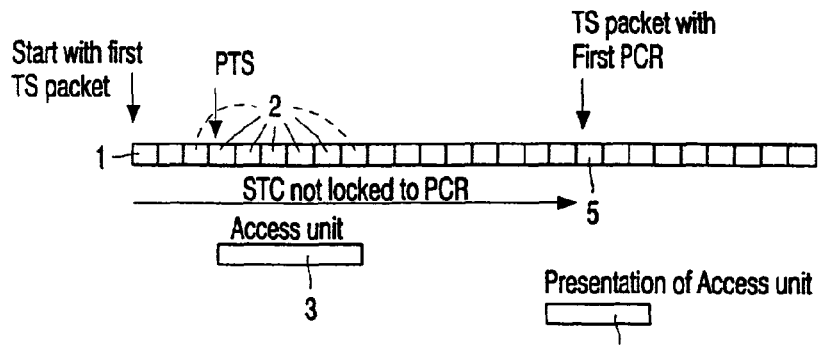

(51) Int. Cl.

| | | |
|---|---|---|
| *G11B 27/034* | (2006.01) | |
| *G11B 27/10* | (2006.01) | |
| *G11B 27/28* | (2006.01) | |
| *G11B 27/30* | (2006.01) | |
| *H04N 9/804* | (2006.01) | |
| *H04N 21/242* | (2011.01) | |
| *H04N 21/4147* | (2011.01) | |
| *H04N 21/43* | (2011.01) | |
| *H04N 21/433* | (2011.01) | |
| *H04N 21/434* | (2011.01) | |
| *H04N 21/845* | (2011.01) | |
| *H04N 5/783* | (2006.01) | |
| *H04N 5/85* | (2006.01) | |

(52) U.S. Cl.
CPC ...... *H04N 21/4302* (2013.01); *H04N 21/4305* (2013.01); *H04N 21/4334* (2013.01); *H04N 21/4344* (2013.01); *H04N 21/8455* (2013.01); *G11B 2220/2562* (2013.01); *H04N 5/783* (2013.01); *H04N 5/85* (2013.01)
USPC ............................ 386/241; 386/326; 386/334

(56) References Cited

U.S. PATENT DOCUMENTS

| | | | | |
|---|---|---|---|---|
| 5,751,721 | A | * | 5/1998 | Bloks ............................ 370/509 |
| 5,805,602 | A | * | 9/1998 | Cloutier et al. ............... 370/516 |
| 5,838,872 | A | * | 11/1998 | Kawara ......................... 386/326 |
| 5,838,876 | A | * | 11/1998 | Iwamura ....................... 386/206 |
| 5,898,695 | A | * | 4/1999 | Fujii et al. .................... 370/464 |
| 5,966,385 | A | * | 10/1999 | Fujii et al. .................... 370/465 |
| 6,169,843 | B1 | * | 1/2001 | Lenihan et al. ............... 386/201 |
| 6,208,643 | B1 | * | 3/2001 | Dieterich et al. ............. 370/389 |
| 6,356,567 | B2 | * | 3/2002 | Anderson et al. ............. 370/516 |
| 6,470,135 | B1 | * | 10/2002 | Kim et al. ..................... 386/241 |
| 6,512,882 | B1 | | 1/2003 | Teunissen |
| 6,542,518 | B1 | * | 4/2003 | Miyazawa .................... 370/468 |
| 8,098,973 | B2 | * | 1/2012 | Kelly et al. ................... 386/214 |

FOREIGN PATENT DOCUMENTS

| | | |
|---|---|---|
| EP | 0944086 A2 | 9/1999 |
| EP | 1021048 A2 | 7/2000 |
| JP | 2002517138 A | 6/2002 |
| WO | 9817094 A1 | 4/1998 |
| WO | 9965027 A2 | 6/1998 |
| WO | 0152554 A1 | 7/2001 |

\* cited by examiner

METHOD OF SETTING A SYSTEM TIME CLOCK AT THE START OF AN MPEG SEQUENCE

This application is a continuation of application Ser. No. 09/936,185 filed Sep. 7, 2001, now U.S. Pat. No. 8,098,973 which is incorporated in whole by reference herein, and which is a U.S. National Phase application of International Application PCT/EP2001/000110 filed Jan. 5, 2001 which claimed foreign priority of EP 00200038.8 filed Jan. 10, 2000.

The invention relates to a method according to the preamble of claim 1. The method further relates to a recording apparatus according to the preamble of claim 7 and a reproducing apparatus according to the preamble of claim 8.

Digital information signals representing a real time stream of A/V information, such as an MPEG encoded Transport Stream, comprise time base information of the transmitting site. In case of an MPEG encoded Transport Stream the time base information is specified by Program Clock Reference (PCR) signals, transmitted regularly within a Transport Packet (TP). This time base information is used to lock a local clock at a receiving site to the clock at the transmitting site. However, this time base information is not sent with every Transport Packet (TP). This has a consequence that at start-up a local clock may not yet be locked by this time base information. This means that it is not known, with respect to Transport Packets (TP) arriving before locking, at which instant these Transport Packets (TP) have to be decoded (in case of Access Units (AU) with a Decoding Time Stamp (DTS)) or to be presented (in case of Access Units (AU) with a Presentation Time Stamp PTS)).

Further, in case discontinuities occur in a real time stream due to concatenation of different streams of different programs with a mutually different time base after for instance editing, the correct timing after such a discontinuity should be restored when starting processing the Transport Packets of a second sequence. However, the Packet Arrival Time (PAT) timestamp counter will be discontinuous after such a discontinuity.

In consequence, amongst other things, it is an object of the invention to obviate the above-mentioned disadvantages. According to one of its aspects a method according to the invention is characterized by the characterizing part of claim 1, a recording apparatus by the characterizing part of claim 7 and a reproducing apparatus by the characterizing part of claim 8.

Calculating the value of System Time Clock of the first information signal packet improves the playback performance and simplifies processing during playback.

Figure 2:
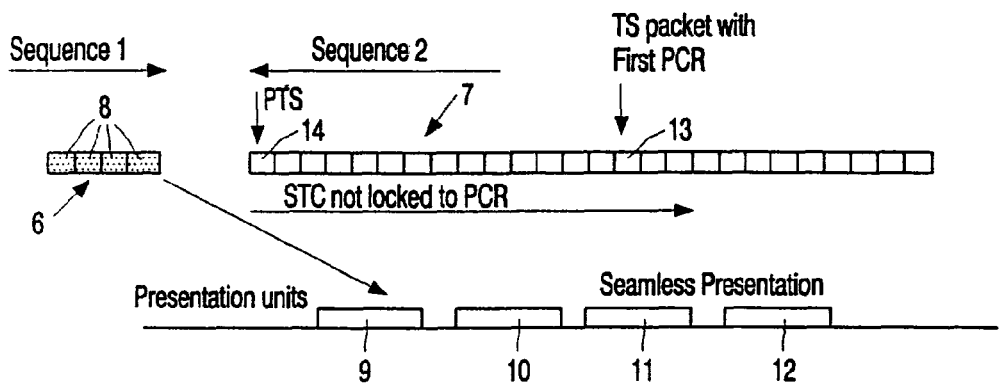
Figure 3:
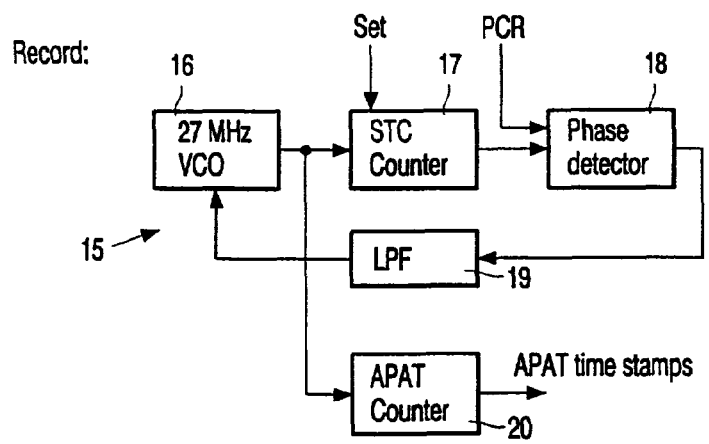
Figure 4:
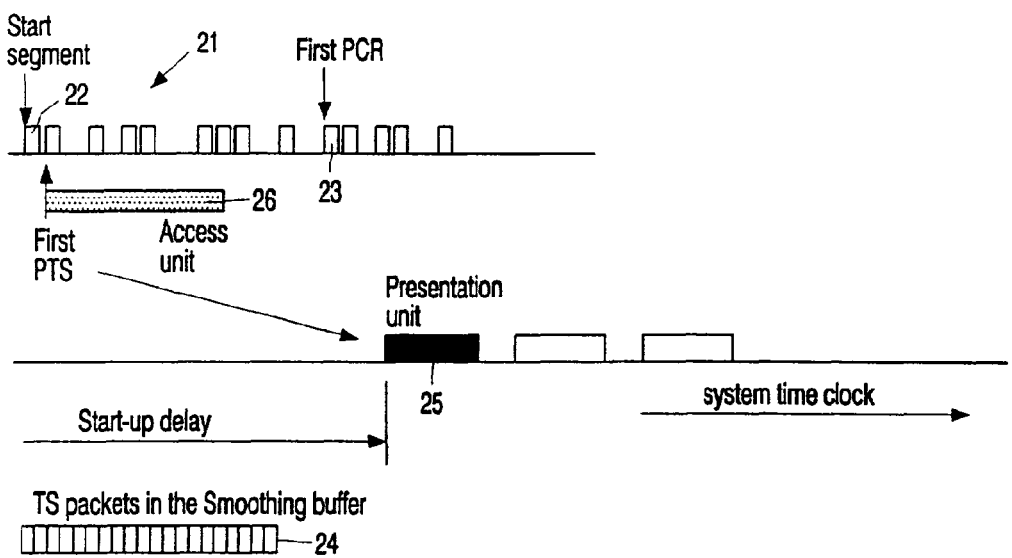
Figure 5:
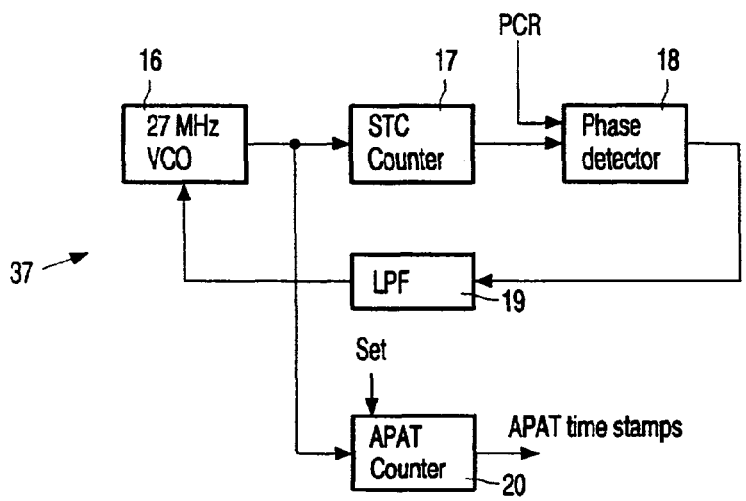
Figure 6:
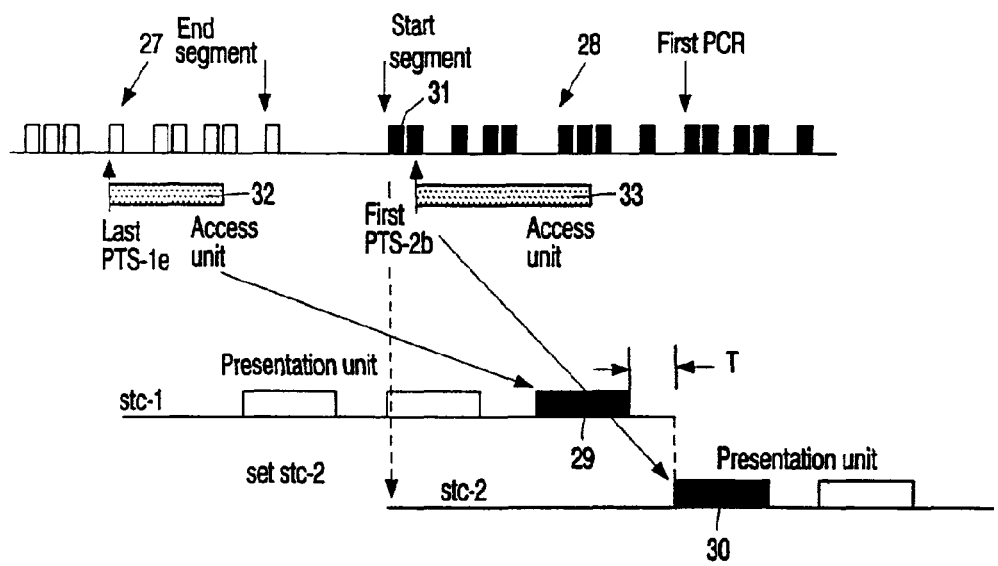
Figure 7:
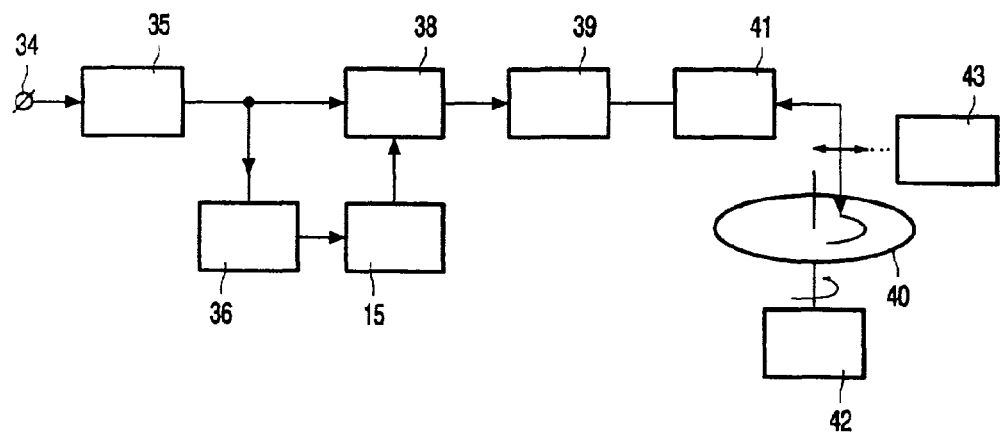
Figure 8:
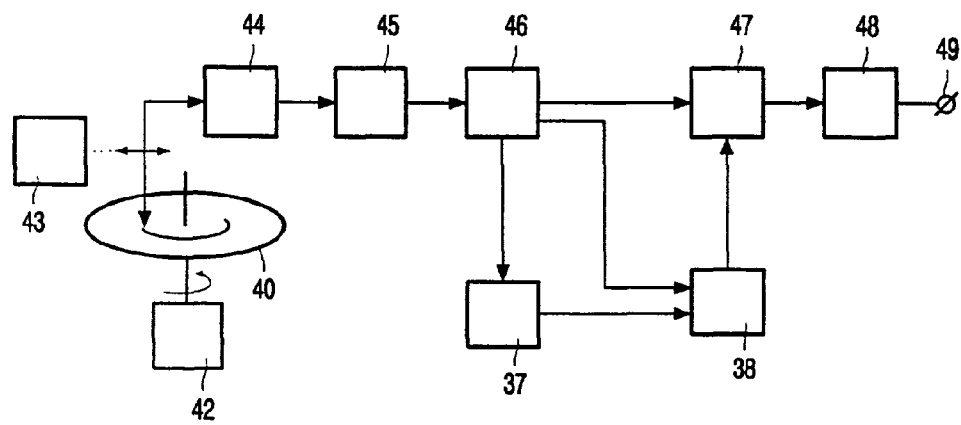
Figure 9:
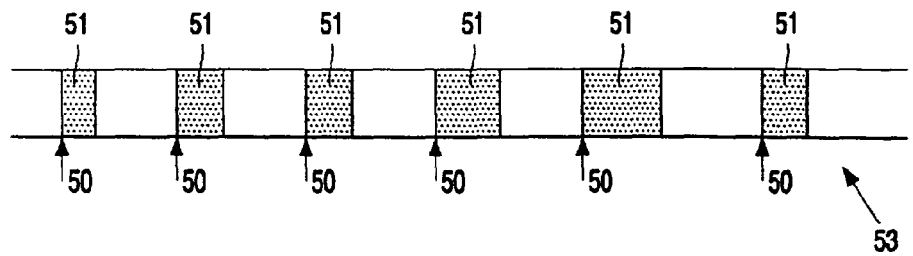
Figure 10:
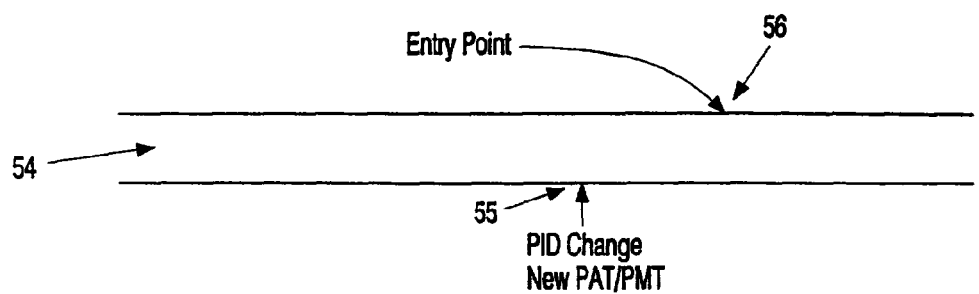
Figure 11:
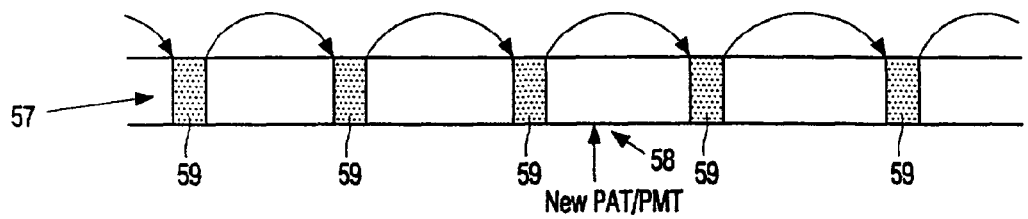

These and further aspects and advantages of the invention will be discussed in more detail hereinafter with reference to the disclosure of preferred embodiments, and in particular with reference to the appended Figures that show:

FIG. 1 schematically a sequence of a stream of MPEG Transport Packets during start-up;

FIG. 2 a discontinuity between two sequences of a stream of MPEG Transport Packets;

FIG. 3 time stamp generator means in a recording/reproducing apparatus during recording according to the invention;

FIG. 4 an example of recording Transport Packets at start-up of a sequence according to the invention;

FIG. 5 time stamp generator means in a recording/reproducing apparatus during playback according to the invention;

FIG. 6 an example of recording Transport Packets during a discontinuity;

FIG. 7 shows a recording apparatus employing the time stamp generator means of FIG. 3, FIG. 8 shows a reproducing apparatus employing the time stamp generator means of FIG. 5, FIG. 9 illustrates an advantageous embodiment of the invention for reading data from a stream of encoded data for trickplay, FIG. 10 illustrates a random access in a stream of MPEG 2 Transport Stream data after a PID change, and FIG. 11 illustrates trickplay of a stream of MPEG 2 Transport stream data after a PAT/PMT change.

FIG. 1 illustrates a sequence of MPEG Transport Packets (TS packet). The sequence starts with a first TS packet 1. The TS packets 2 constitute an encoded Access Unit 3 to be presented as a decoded Presentation Unit 4 at a time specified by a corresponding Presentation Time Stamp (PTS). This Access Unit 3 is received before a local System Time Clock at a receiving site, such as a 27 MHz PLL, is locked to the time base information comprised in the stream. This Program Clock Reference (PCR) is first received with the TP packet 5. Therefore it is not known when the Access Unit 4 should be presented as the Presentation Time Stamp (PTS) points to time interval before the arrival of the first Program Clock Reference (PCR).

FIG. 2 illustrates a discontinuity in a stream of MPEG Transport Packets (TS packets). A first sequence 6 of TS packets is followed by a second sequence 7 of TS packets. Each sequence having it own time base information or Program Clock Reference (PCR). This situation might occur after editing of a stream. The Packet Arrival Time counter is therefore discontinuous. The last Access Unit (AU) constituted by the TS packets 8 of the first sequence is presented as a Presentation Unit 9 seamlessly with other Presentation Units 10, 11 and 12 from the second sequence. However, the first TS packet with Program Clock Reference (PCR) of the second sequences 7 arrives with TS packet 13 while the TS packet 14 to be presented is received prior. Therefore, the local System Time Clock is not yet locked to the PCR of the second sequence.

FIG. 3 illustrates time stamp generator means 15 in a recording/reproducing apparatus according to a first embodiment of the invention. A 27 MHz Voltage Controlled Oscillator 16 controls the System Time Counter (STC) 17, which is set to an arbitrary value during start-up and counts in an MPEG way (like PCR, PTS, DTS) As soon as the first Program Clock Reference (PCR) information arrives, the System Time Counter (STC) 17 is set to the value of this Program Clock Reference (PCR). Further locking is achieved by a phase detector that compares the received Program Clock Reference (PCR) information with the System Time Counter (STC) value. The phase difference is used, via a Low Pass Filter (LPF) 19, to the Voltage Controlled Oscillator (VCO) 16, constituting a Phase Locked Loop (PLL). The System Time Clock is used to control a binary Application Packet Arrival Time (APAT) counter 20 for generating corresponding APAT time stamps.

During start-up the APAT counter 20 starts at an arbitrary value. APAT time stamps are appended to every received TS packet. The time stamps represent the arrival time of the TS packets. The APAT[start] time stamp of the first TS packet of a sequence and also the APAT[PCR] timestamp of the TS packet which contains the Program Clock Reference (PCR) is stored temporarily in memory means. The number of 27 MHz cycles between the two time stamps is calculated by subtracting APAT[start] from APAT[PCR]. With the difference the start of the System Time Counter (STC-start) is calculated by subtracting this difference from the first received PCR-value.

STC-start is the value the STC-counter 17 would have if it were locked from the beginning. STC-start is preferably stored as segment attribute when storing the MPEG stream on a recording medium, such as a disc.

FIG. 4 shows an example of playback of Transport Packets at start-up of a sequence according to the invention. Shown are irregular received TS packets 21, the arrival time of the TS packets 21 given by the APAT time stamp. The timing between the TS packets 21 should be kept constant on a digital interface during playback. The Start Segment 22 does not need to start with a Program Clock Reference (PCR), this information is received later with TS packet 23. The repetition frequency of the Program Clock Reference (PCR) information could be 100 ms with a recommendation of 40 ms. The received TS packets 21 are temporarily stored in smoothing buffer 24. This causes a start-up delay until the Presentation Unit (PU) 25 given by the Access Unit (AU) 26 comprising corresponding TS packets 21, is presented. It is noted that this delay is needed if the APAT timing of the stream is to be kept.

From the content of a smoothing buffer 24 the original timing can be reconstructed during playback, which is shown with reference to FIG. 5. FIG. 5 shows time stamp generator means for generating the correct timing of a recorded stream of TS packets recorded in accordance with the invention, as illustrated with reference to FIG. 4. The disclosed embodiment has a great similarity with the embodiment disclosed in FIG. 3, reference numeral are therefore identical. The difference being the ability of setting the System Time Clock (STC)-counter 17 and the Application Packet Arrival Time (APAT) counter 20. Immediately after starting, the System Time Counter (STC) 17 is set with the STC-start value, which has been stored in the segment attribute for instance, as discussed previously. From this moment the System Time Counter (STC) 17 is locked to the Program Clock Reference (PCR). The Application Packet Arrival Counter (APAT) 20 is set with the Application Packet Arrival Time (APAT) time stamp from the first TS packet. TS packets are retrieved from the smoothing buffer 24 at the time which is indicated by the Application Packet Arrival Time (APAT) time stamp. It is noted that for an internal decoder it is not needed but on the interface the stream should start with an inserted Program Clock Reference (PCR) packet to replace the STC-start.

FIG. 6 shows an example of recording Transport Packets during a discontinuity. The Application Packet Arrival Timestamps (APAT) of the first sequence 27 and the second sequence 28 are discontinuous at the connection point. The offset between both counters should be calculated. Then the correct timing can be reconstructed in a smoothing buffer. Shown is an Access Unit (AU) 32, constituting the last segment to be presented as Presentation Unit 29, from the first sequence 27. A subsequent Presentation Unit (PU) 30, corresponding to the first Access Unit (AU) 33 of the second sequence 28 follows. The Presentation Unit (PU) 29 comprises a Presentation Time Stamp PTS-1e with reference to a first local System Time Counter STC-1. The Presentation Unit (PU) 30 comprises a Presentation Time Stamp PTS-2$b$ with reference to a second local System Time Counter STC-2. It is assumed that the connection point is of the C-type, implying that by definition there are no buffer problems after the discontinuity, there is no overlap in APAT time stamps from a first and second segment and the presentation units 29 and 30 are presented seamlessly.

From the fact that the presentation is seamless, it is known when on the local time base STC-1, the first presentation unit 30 of the second segment should be presented: PTS-1$e$+T. From the first presentation unit 30 of the second segment it is known when this presentation unit should be presented on the local time base STC-2: PTS-2$b$. The number of clock cycles between the arrival time of the first TS packet and the presentation time is known: PTS-2$b$−STC-start(2). So it can be calculated at what moment in the local time base STC-1 the local time base STC-2 should set to STC-start(2).

It is remarked that an overlap is needed for STC-1 and STC-2 in a decoder (about 1 second)

FIG. 7 shows a recording apparatus with an input terminal 34 and receiving means 35 for recording received information signals representing Transport Packets. A packet detector 36 detects the arrival of the received Transport Packets and the embedded Program Clock Reference (PCR) signals. A Time Stamp Generator 15, as disclosed with reference to FIG. 3, as locked with its local System Time Counter to the Program Clock Reference (PCR) signals. At start-up the Time Stamp Generator 15 is set to an arbitrary value for setting the local System Time Counter as disclosed with reference to FIG. 3. The generated Time Stamps, together with the System Time Counter start value (STC-start), is combined with the received Transport Packets in a combining unit 38. The combined signals are channel encoded with channel encoding means 39 and recorded on a record carrier 40 by writing means 41. The record carrier may be of the disc like type in which case it is rotationally driven by rotating means 42 while a recording writing beam is displaced in a radial direction by translating means 43. The record carrier 40 may be of the optical type, such as a recordable CD, DVD. In this case the writing means 41 generates a laser beam for writing and comprises suitable focussing means. In another embodiment the record carrier 40 may be of the magnetic type, such a magnetic disc.

FIG. 8 shows a reproducing apparatus adapted to scan a recording medium 40, recorded in accordance with the method of the invention, with a reading beam with suitable reading means 44. In case if the record carrier 40 is of the optical type, such as a CD, DVD, the reading means comprises a laser beam and corresponding focussing means to scan the record carrier 40. The detected signal is channel decoded by channel decoding means 45. The decoded Transport Packets with Time Stamps are supplied to demultiplexing means 46 for separating the Time Stamps from the Transport Packets. The Time Stamp are supplied to comparator means 38. The generated Time Stamp value generated by the Time Stamp generating means 37, such a disclosed with reference to FIG. 5, is also supplied to this comparator means 8. A recorded System Time Clock start value (STC-start) is submitted to the Time Stamp generating means 37, for locking the Time Stamp Counter to this value whenever necessary, in accordance with the method according to the invention. The generated Time Stamp value is compared with the recorded and extracted Time Stamp values. When both coincide, the corresponding Transport Packet stored in buffer memory 47 is submitted to outputting means 48, for generating a real time stream of Transport Packets at output terminal 49.

As mentioned before, the Transport Packets may comprise real time A/V information. A combined recording and reproducing device, such as described with reference to FIG. 7, respectively FIG. 8, may be used as a disk based video recorder. For user convenience it may be allowed to a user to set marks on key points within the recorded A/V program in order to indicate key scenes, commercial ends and so on. These key points are typically chosen to be video entry points, such as I-frames in MPEG2. However, to allow the playback device to decode the video at these points, additional information is needed.

It is remarked that a complete description of the MPEG2 format can be found in the corresponding international standards ISO/IEC 13818. I-frames are intra encoded frames that can be decoded independently from each other, this in contrast to P-frames that are predictive encoded and need a previous P- or I-frame. Further B-frames or bi-directional frames can be distinguished that need a preceeding and succeeding I- or P-frame to encode.

An advantageous embodiment is obtained by storing additional information with the mark point to allow decoding at the mark point. If this is not done, it may take some time (1-2 seconds) before correct decoding begins and this part of the video will not be displayed correctly.

For an MPEG2 Transport Stream, the mark point should store the following information: the Program Clock Reference (PCR) at the entry point, the Presentation Time Stamp (PTS) of the I-frame, the Decoding Time Stamp (DTS) of the I-frame and the Packet Identification (PID) mapping for the stream. This information allows a decoder to start decoding correctly from the mark point.

To perform trickplay, that is reproducing video with a speed different from the normal playback speed, on a digital video stream of the MPEG2 type as described above, requires extracting and decoding only parts of the video stream and discarding the rest. In many cases, such as for example with DVD, pointers are provided to both the start of the required data and to the end of the required data without parsing the stream. An advantageous method and embodiment will be discussed in case where the end of the required data is not stored, necessitating a reproducing device to parse the stream to find out which parts should be discarded.

If a reproducing device does not know where the end of the trickplay information is in the stream, then a simple approach is to read all the stream data from the start point to the next start point. This increases the amount of device memory required to perform trickplay and increases the performance requirements of a record carrier. The advantageous method and embodiment disclosed hereinafter provides a way to reduce the amount of data that needs to be read from the record carrier and to be stored in a device memory.

Two types of trickplay are considered. The first is one where only I-frames are read from the stream and the second one where I-frames and some P-frames are read. It is assumed that the location of the start of the I-frames are stored but not the end and not any P-frame points.

The basic insight underlying the advantageous embodiment and method, is that instead of reading a complete Group of Pictures (GOP) to get the I-frame, only a fraction of the GOP is read, based on an estimate for the size of the I-frame. A Groups of Pictures (GOP) is defined in the MPEG2 format (ISO/IEC 13818) and comprised at least one I-frame and one or more P- or B-frames. For example, in a section of a DVD disc, the average I-frame size may be 28 sectors and the average GOP size may be 199 sectors. This leads to choose to read out one quarter (50 sectors) of the GOP to get the I-frame. This is almost twice the average so it could be enough in the worst case. The estimate used should be based on measurements of broadcast streams and may differ for HDTV streams and SD streams.

The same approach works for trickplay using P-frames as well as I-frames. In this case the percentage of the GOP to read will be larger.

From the Characteristic Point Information for trickplay, such as for example disclosed in the International Patent Application with Application Number EP99/08285 (PHN 17161), the Presentation Time Stamp (PTS) of the I-frame and the next I-frame are known. This enables the calculation the number of frames in a GOP. This may be advantageously used to modify the general estimate for each specific GOP structure.

With this approach it may occur in some cases that the complete I-frame cannot be read. If this happens occasionally, it is no problem. It just means that the trickplay refresh rate will be reduced.

If reading a stream with I-frames that are consistently bigger than estimated, will result in bad looking trickplay performance. To avoid this the algorithm is made adaptive. For example, if it found that two I-frames within a given time period are bigger than estimated, the percentage of the GOP read is increased. If this continues to happen, the percentage of GOP read is increased again. This algorithm should converge very quickly on a value that is big enough. It is also possible to adaptively reduce the amount of data being read. This may be particular useful if P-frames are used for trickplay in a stream without B-frames.

Particular encoders and hence particular streams tend to be very regular in the relative size of the pictures they use. Also encoders normally stick to a fixed GOP size. Therefore, this adaptive approach should be very effective in practice. Using the Presentation Time Stamp (PTS) time in the Characteristic Point Information (CPI) to calculate the number of pictures in the GOP ensures that this method will also work for irregular GOP structures.

Alternatively, the stream could be parsed during record for I-end and the percentage of the GOP to be read on trickplay could be stored to get the I-frame. This value could used as the worst case size or as a value big enough to ensure getting the complete I-frame in 95% or 99% of the cases.

This method will work equally well for multiple video streams in a single program. In this case the percentage of the GOP to be read will be the same but actual amount will be larger.

FIG. 9 shows an example of a stream 53 of encoded MPEG2 data, the arrows 50 indicating the entry points stored in the Characteristic Point Information (CPI). Without knowing the I-end points, a reproducing device according to the invention does not need to read until the next entry points 50 during trickplay. Note that the amount 51 of data read depends on the amount of data in the GOP.

Next an advantageous embodiment will be discussed to handle Packet Identification (PID) changes in a recording device when receiving a stream of Information Signal Packets such as MPEG 2 Transport Streams. This may occur for instance with digital TV broadcasts based on MPEG 2 Transport Streams. Packet Identifiers (PIDs) or used to identify different streams with a multiplex of streams. For example, there may be a PID for video, a PID for audio, a PID for timing information and a PID for teletext information. In the case of a broadcast where there are multiple video streams or audio streams within a single program, there will be a PID for each video stream and for each audio stream. During a digital TV broadcast the PIDs may change with either new PIDs replacing the old PIDs or a change in the correspondence between PIDs and streams. A change in the PID mapping is signaled by Program Association Table (PAT) and Program Map Table (PMT) in the MPEG Transport Stream. Therefore, if the digital TV broadcast is processed as a stream, the decoding device will know when the PIDs change and will know the new PID mapping.

It is remarked that according to the MPEG 2 standard, a Program Association Tabel (PAT) maps program identities to their program transport streams. The PAT indicates the PID of the bitstream containing the Program Map Table (PMT) for a program.

A problem is that when a digital TV signal is recorded, it will not always be played back completely from start to finish. The playback device may jump within a stream (random access) or it may select only parts of a stream for decoding (trickplay). Therefore, the playback device may not know that the PID mapping has changed before it starts to decode the stream. For example, during trickplay the audio is normally filtered out of the stream. If the correct PID mapping is not known then it will not be possible to filter the audio and in some cases it could result in the video being filtered instead (if the audio and video PIDs are switched). Also a recording device may introduce additional PID changes due to editing.

The method and embodiment according to the invention comprising storing meta-data about a recording to record the points where the PIDs change. Also the new PID mapping will be stored. For each PID change at least the following information should be stored:
1) the time within the stream where the PIDs change,
2) the location within the stream where the PIDs change, for example by referring to the Transport Stream (TS) packet where the new PIDs are used,
3) the Program Number,
4) the Program Clock Reference (PCR) PID,
5) the Video PIDs,
6) the Audio PIDs.

In the case of multiple video streams or multiple audio stream, the correspondence between the streams should be stored. For example, this can be made implicit. The order of the streams in the structure defines their correspondence.

FIG. 10 illustrates the case of random access in an audio or video stream 54, such as an MPEG 2 Transport Stream, after a PID change 55. When the playback device jumps to an entry point 56 in the stream it needs to know the PID mapping to begin decoding and presenting the data. The PAT/PMT tables that define the PID mapping are repeated within the stream but they will not in general be present just before an entry point. By looking up the meta data that records the PID changes, the playback device can see what the correct PIDs are for this part of the program and so multiplex and decode the stream correctly. In the case of multiple video streams or multiple audio streams, the playback device can ensure that it presents the video stream that correctly corresponds to the previous displayed one if applicable. If the stream is being sent over a digital interface then the playback device can use the meta data to insert a new PAT and PMT table to indicate the new PID mapping.

FIG. 11 illustrates trick play of an audio or video stream 57 after a PAT/PMT table change 58. The trick play data to be reproduced is indicated with portions 59. The meta data defining the PID mapping allows the playback device to filter out non-video streams and ensure that the trickplay uses the correct video stream in the case of mutiple video streams. If the trickplay stream is being sent over an interface, then the video PID can be remapped during playback, then when normal play is resumed, the playback device can insert a new PAT and PMT to indicate the new PID mapping.

Although the invention has been described with reference to preferred embodiments thereof, it is to be understood that these are not limitative examples. Thus, various modifications thereof may become apparent to those skilled in the art, without departing from the scope of the invention, as defined by the claims. The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

The invention claimed is:

1. Apparatus for recording a real time sequence of information signal packets (TS packet) comprising A/V information, on a record carrier, the sequence comprising at intervals of multiple information signal packets, Program Clock Reference (PCR) information for locking a local System Time Counter (STC) to a clock at a transmitting site, the apparatus comprising:

receiving means for receiving the information signal packets, a local System Time Counter (STC) for generating counts, time stamp generating means for generating a time stamp corresponding to an arrival time of the information signal packets, writing means for recording the generated time stamps and information signal packets on the record carrier, the time stamp generating means comprising an Application Packet Arrival Time Stamp (APAT) counter for generating an Application Packet Arrival Time Stamp (APAT) when a packet is received based on the local System Time Counter (STC), the Application Packet Arrival Counter (APAT) being set with the Application Packet Arrival Time (APAT) time stamp from a first information signal packet;

wherein the time stamp generating means determines a number of counts of the local System Time Counter (STC) between said Application Packet Arrival Time Stamp (APAT) and the Application Packet Arrival Time Stamp (APAT) of the first information signal packet that comprises Program Clock Reference (PCR) information;

the time stamp generating means subtracts said number of counts from the a Program Clock Reference (PCR) value of the Program Clock Reference (PCR) Information to retrieve a System Time Counter start value (STC-start);

the writing means records on the record carrier the sequence of information signal packets with the appended Application Packet Arrival Time Stamps (APAT) and the System Time Counter start value (STC-start) as an attribute of the sequence.

2. The apparatus of claim 1, wherein the real time sequence of information signal packets is a sequence of MPEG-2 Transport Stream Packets.

3. A non-transitory record carrier comprising a real time sequence of information signal packets (TS) stored on the record carrier, the sequence comprising:

A/V information,

Application Packet Arrival Time Stamps (APAT), the Application Packet Arrival Time Stamps (APAT) indicated the time when the corresponding packet has been received by a recording apparatus, a System Time Counter start value (STC-start) corresponding to a Program Clock Reference (PCR) value obtained by subtracting from the PCR value of a first information signal packet comprising Program Clock Reference (PCR) information, a value of a difference between an Application Packet Arrival Time Stamp (APAT) of the first information signal packet that comprises Program Clock Reference (PCR) information and an Application Packet Arrival Time Stamp (APAT) of a first packet in the sequence, wherein the System Time Counter start value (STC-start) is stored as an attribute of the sequence.

4. The non-transitory record carrier of claim 3, wherein the real time sequence of information signal packets is a sequence of MPEG-2 Transport Stream Packets.

5. Apparatus for reproducing a real time sequence of information signal packets (TS packet) comprising A/V information, the sequence being stored on a record carrier, the information signal packets further comprising stored Application Packet Arrival Time Stamps (APAT), the Application Packet Arrival Time Stamps (APAT) indicated the time when the corresponding packet has been received by a recording apparatus, the record carrier further comprising stored thereon a System Time Counter start value (STC-start), the System Time Counter start value (STC-start) corresponding to a Program Clock Reference (PCR) value obtained by subtracting from the PCR value of a first information signal packet comprising Program Clock Reference (PCR) information a value of a difference between an Application Packet Arrival Time Stamp (APAT) of the first information signal packet that comprises Program Clock Reference (PCR) information and an Application Packet Arrival Time Stamp (APAT) of a first packet in the sequence, the System Time Counter start value (STC-start) stored as an attribute of the sequence, the apparatus comprising:
  reading means for reading the information signal packets recorded on the record carrier,
  storing means for temporarily storing a number of information signal packets read from the record carrier,
  time stamp generating means for generating a time stamp associated to an information signal packet,
  comparator means for comparing a stored Application Packet Arrival Time Stamp (APAT) of the information signal packet with the generated time stamp,
  outputting means for outputting an information signal packet from the storing means when the generated time stamp coincides with the corresponding stored Application Packet Arrival Time Stamp (APAT),
  wherein the time stamp generation means generate a time stamp from an Application Packet Arrival Time Stamp (APAT) counter derived from a local System Time Counter locked to retrieved Program Clock Reference (PCR) information, the System Time Counter (STC) being set with a System Time Counter start value (STC-start) retrieved from the record carrier.

6. The apparatus of claim 5, wherein the real time sequence of information signal packets is a sequence of MPEG-2 Transport Stream Packets.

7. Apparatus for recording a real time sequence of information signal packets comprising A/V information, on a record carrier, the sequence comprising Program Clock Reference (PCR) information for locking a local System Time Counter, Presentation Time Stamp (PTS) information for determining the presentation time of the information in the information signal packets, Decoding Time Stamp (DTS) information for determining the decoding time of the information in the information signal packets, and Packet Identification (PID) mapping information, the apparatus comprising:
  receiving means for receiving the information signal packets,
  writing means for recording the information signal packets on the record carrier,
  the apparatus further enabled to store on the record carrier, separate from the real time sequence of information signal packets, Characteristic Point Information for enabling trickplay, the Characteristic Point Information comprising a sequence of entry points;
  the apparatus further enabled to add mark points at specific entry points in the sequence of entry points,
  the apparatus being further enabled to store in addition to a mark point one or more of the following information entities: Program Clock Reference (PCR) information, Presentation Time Stamp (PTS) information, Decoding Time Stamp (DTS) information, and Packet Identification (PID) mapping information.

8. Apparatus of claim 7, wherein the real time sequence of information signal packets is a sequence of MPEG-2 Transport Stream Packets.

9. Apparatus of claim 7, wherein the mark points are at I-frames in an MPEG-2 stream.

10. A method of generating Application Packet Arrival Time Stamp (APAT), of a received real time sequence of information signal packets (TS packet) comprising A/V information, and of recording the sequence of information signal packets with the appended Application Packet Arrival Time Stamps (APAT), the sequence comprising at intervals of multiple information signal packets Program Clock Reference (PCR) information for locking a local System Time Counter (STC) to a clock at a transmitting site, the method comprising:
  determining a packet arrival time of each packet using an Application Packet Arrival Time Stamp (APAT) counter derived from a local System Time Counter (STC), and appending a corresponding Application Packet Arrival Time Stamp (APAT) to received information signal packets,
  setting Application Packet Arrival Time Stamp (APAT) counter at an arbitrary value before receiving a first information signal packet,
  temporarily storing the Application Packet Arrival Time Stamp (APAT) of the first information signal packet of the sequence and of the first information signal packet comprising Program Clock Reference (PCR) information,
  determining a number of counts of the local System Time Counter (STC) between said Application Packet Arrival Time Stamps (APAT),
  subtracting this number from the Program Clock Reference (PCR) value to retrieve a System Time Counter start value (STC-start),
  storing on a record carrier the sequence of information signal packets with the appended Application Packet Arrival Time Stamps (APAT) and storing on the record carrier the System Time Counter start value (STC-start) as an attribute of the stored sequence.

11. A method of claim 10, wherein the real time sequence of information signal packets being a sequence of MPEG-2 Transport Stream Packets.

12. The method of claim 10, wherein the method comprises:
  storing on the record carrier, separate from the real time sequence of information signal packets, Characteristic Point Information for enabling trickplay, the Characteristic Point Information comprising a sequence of entry points; and
  adding mark points at specific entry points in the sequence, the mark points being added at I-frames in an MPEG-2 stream.

13. Method of reproducing a stored real time sequence of information signal packets (TS) comprising A/V information, the information signal packets further comprising stored Application Packet Arrival Time Stamps (APAT), the Application Packet Arrival Time Stamps (APAT) indicated the time when the corresponding packet has been received by a recording apparatus, the record carrier further comprising stored thereon a System Time Counter start value (STC-start), the System Time Counter start value (STC-start) corresponding to a Program Clock Reference (PCR) value obtained by subtracting from the PCR value of a first information signal packet that comprises Program Clock Reference (PCR) information, a value of a difference between an Application Packet Arrival Time Stamp (APAT) of the first information signal packet that comprises the Program Clock Reference (PCR) and an Application Packet Arrival Time Stamp (APAT) of a first packet in the sequence, the System Time Counter start value (STC-start) being stored as an attribute of the sequence, the method comprising:

running an Application Packet Arrival Time Stamp (APAT) counter derived from a local System Time Counter (STC), setting the Application Packet Arrival Counter (APAT) with the Application Packet Arrival Time (APAT) time stamp from the first TS packet, locking the local System Time Counter (STC) to retrieved Program Clock Reference (PCR) information, retrieving information signal packets and their corresponding stored Application Packet Arrival Time Stamps (APAT) from the record carrier, temporally storing a number of retrieved information signal packets, outputting an information signal packet when the corresponding stored Application Packet Arrival Time Stamp (APAT) coincides with the Application Packet Arrival Time (APAT) Counter, retrieving the System Time Counter start value (STC-start) from the record carrier, setting the System Time Counter (STC) with the retrieved System Time Counter start value (STC-start).

14. A method of claim 13, wherein the real time sequence of information signal packets being a sequence of MPEG-2 Transport Stream Packets.

15. The method of claim 13, wherein the method comprises:

storing on the record carrier, separate from the real time sequence of information signal packets, Characteristic Point Information for enabling trickplay, the Characteristic Point Information comprising a sequence of entry points; and adding mark points at specific entry points in the sequence, the mark points being added at I-frames in an MPEG-2 stream.

16. A method of storing a real time sequence of information signal packets comprising A/V information, the signal being stored on a record carrier, the sequence comprising Program Clock Reference (PCR) information for locking a local System Time Counter, Presentation Time Stamp (PTS) information for determining the presentation time of the information in the information signal packets, Decoding Time Stamp (DTS) information for determining the decoding time of the information in the information signal packets, and Packet Identification (PID) mapping information, the method comprising:

storing on the record carrier, separate from the real time sequence of information signal packets, Characteristic Point Information for enabling trickplay, the Characteristic Point Information comprising a sequence of entry points;

adding mark points at specific entry points in the sequence, storing in addition to a mark point one or more of the following different information entities: Program Clock Reference (PCR) information, Presentation Time Stamp (PTS) information, Decoding Time Stamp (DTS) information, and Packet Identification (PID) mapping information.

17. A method of claim 16, wherein the real time sequence of information signal packets being a sequence of MPEG-2 Transport Stream Packets.

18. The method of claim 16, wherein the mark points are added at I-frames in an MPEG-2 stream.

* * * * *